United States Patent [19]

Braukmann

[11] 4,231,386
[45] Nov. 4, 1980

[54] DIFFERENTIAL PRESSURE RELIEF VALVE

[75] Inventor: Heinz W. Braukmann, Willowdale, Canada

[73] Assignee: Braukmann Armaturen AG, Rothrist, Switzerland

[21] Appl. No.: 889,247

[22] Filed: Mar. 23, 1978

[51] Int. Cl.³ .............................................. G05D 7/01
[52] U.S. Cl. ..................................... 137/117; 417/299
[58] Field of Search ................. 137/117, 501; 417/299, 417/300

[56] References Cited

U.S. PATENT DOCUMENTS

| | | | |
|---|---|---|---|
| 1,934,758 | 11/1933 | Temple | 137/117 X |
| 2,219,408 | 10/1940 | Benz | 137/501 X |
| 2,915,084 | 12/1959 | Taylor | 137/501 |

FOREIGN PATENT DOCUMENTS 1076401  7/1967  United Kingdom ..................... 137/501

Primary Examiner—Robert G. Nilson
Attorney, Agent, or Firm—William T. Howell

[57] ABSTRACT

A differential pressure relief valve formed of a housing having first and second chambers sealed from the atmosphere and separated by an annular diaphragm with the chambers and the annulus of the diaphragm traversed by a moveable sleeve. The first chamber communicates to a primary pressure source through a first channel in the housing and the second chamber communicates to a secondary pressure source through holes provided in the sleeve and then to a second channel in the housing. The end of the sleeve protruding from the second chamber is engageable with a seat in the housing. The arrangement is such that when the primary pressure exceeds the secondary pressure by a predetermined amount, the end of the sleeve protruding from the second chamber engages the seat but if the primary pressure does not exceed the secondary pressure by the predetermined amount, the end of the sleeve does not engage the seat, and fluid escapes from the source through the second channel and communicating sleeve, past the seat.

3 Claims, 2 Drawing Figures

DIFFERENTIAL PRESSURE RELIEF VALVE

FIELD OF THE INVENTION

This invention relates to differential pressure relief valves wherein an actuator such as a diaphragm or piston opens or closes a valve if a certain differential pressure is obtained.

PRIOR ART

Differential pressure relief valves of the type referred to above are ordinarily connected to a conduit by means of tubing with one side of the valve chamber, which is separated by a diaphragm, connected to the primary or inlet pressure side of the conduit and the other side of the valve chamber connected to the secondary or outlet pressure side of the conduit. In order to have both chambers connected in this manner, it is common to use adaptors which is added expense. Also valves are often installed in circumstances where damage to the tubing is likely to occur, thus impairing the function of the valve.

In some cases one of the tubular connections can be eliminated by having the upper or secondary pressure chamber connected through a separate hole in the valve body which is directly attached to the conduit conveying the fluid, but this still leaves the other chamber to be connected by tubing.

SUMMARY OF THE INVENTION

It is an object of the invention to provide a differential pressure relief valve which functions in a requisite manner and is connected directly with the pressure system without extraneous tubing.

The invention consists in providing a housing to the differential pressure relief valve which has first and second channels aligned with similar apparatus in the conduit and connected thereby to a similarly apertured gasket. The first channel in the housing communicates from the high pressure side in the conduit to an upper chamber in the housing, which is separated from a lower chamber by a diaphragm, the outer edge of which is secured to the housing. Slidably located in the housing is a sleeve which traverses both chambers and is secured to the inner edge of the diaphragm. The sleeve is sealed in the housing to isolate the upper and lower chambers from the atmosphere. The lowest end of the sleeve extending from the lower chamber engages a seat provided in the housing; the sleeve has holes which communicate with the lower chamber. The upper end of the sleeve communicates with the second channel in the housing and then to the secondary pressure side of the conduit. In order to adjust the differential pressure difference a spring may be provided which bears against the sleeve and urges it away from the seat.

When the primary pressure exceeds the secondary pressure by a predetermined amount, the lower end of the sleeve engages the valve seat. When the primary pressure does not exceed the secondary pressure by the predetermined amount, the lower end of the sleeve does not engage the valve seat, and fluid escapes from the conduit through the second channel and the sleeve past the valve seat until the differential pressure rises to the predetermined amount.

BRIEF DESCRIPTION OF THE DRAWING

The invention will now be described in relation to FIGS. 1 and 2, which are cross sectional views in the open and closed position of a differential pressure valve constructed according to the invention.

DESCRIPTION OF PREFERRED EMBODIMENT

Figure 1:
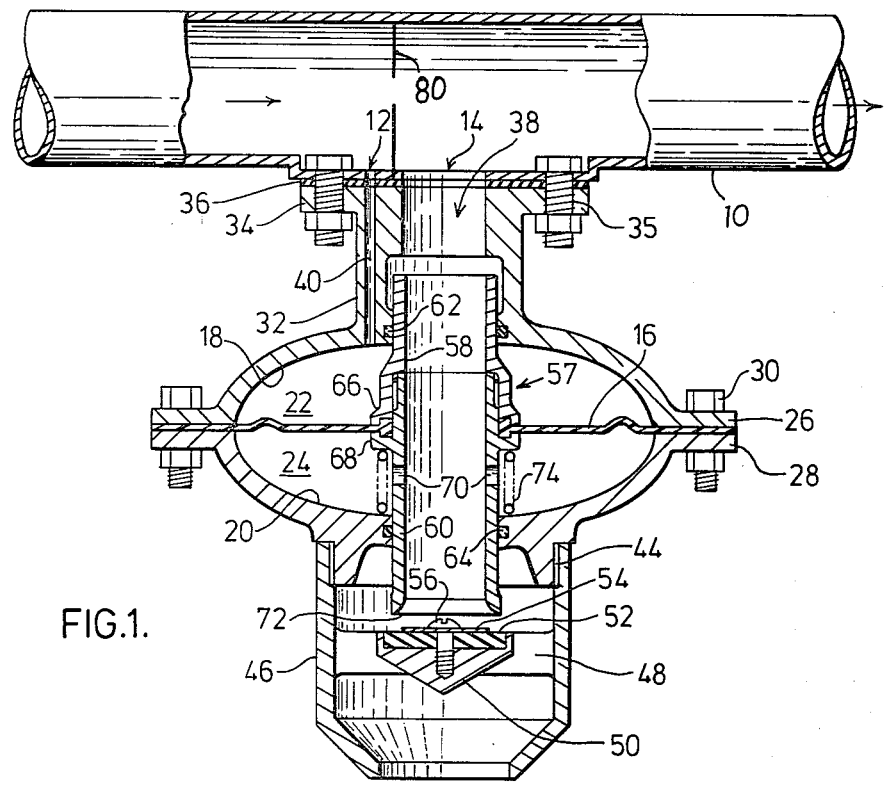

The pressure system generally denoted by the numeral 10, and shown by a conduit in the drawing, has the direction of flow from left to right and hence the pressure drops in the same direction. The conduit has the usual pair of apertures 12 and 14 to which tubing would be connected in known manner through adaptors to conventional differential pressure relief valves.

The valve of the invention has an annular diaphragm 16, separating similarly shaped upper and lower half shells 18 and 20 respectively, which form a housing thus providing an upper chamber 22 and a lower chamber 24. Each shell 18 and 20 is rimmed by a flange 26 and 28 respectively between which is held the outer end of the annular diaphragm 16, secured in position by means of screws 30.

The upper shell 18 has an upwardly extending neck 32 which terminates in a flange 34 on which is positioned a sealing gasket 36. The flange 34 has threaded holes 35 for attachment to the conduit 10.

The neck 32, flange 34 and sealing gasket 36 are traversed by a centrally disposed channel 38 and offset channel 40, each leading into the upper chambers 22 at their lower end. The upper end of channel 38 and 40 communicate respectively with apertures 14 and 12 in the conduit.

The lower shell 20 has a centrally placed channel 42 which is in line with the channel 38 of the upper shell 18. Spaced from and surrounding the channel 42 is an exteriorly threaded spigott 44. A hollow member 46 is threaded onto the spigott 44. The hollow member 46 has a cross arm 48 which supports a conventional insert 50 carrying a resilient valve seat 52 held in place by a washer 54 and a screw 56.

Traversing the chambers 22 and 24 and slidably located in the channel 38 and 42 is a tubular sleeve construction, generally denoted by the numeral 57, and formed of two parts 58 and 60. The upper part 58 is sealed from the shell 18 by seal 62 and the lower part 60 is sealed from the shell 20 by seal 64. Thus chambers 22 and 24 are closed to the atmosphere. The lower end of part 58 and the upper end of part 60 are flanged and stepped at 66 and 68 respectively to engage the enlarged inner edge of the annular diaphragm 16 as illustrated in the drawing.

The lower sleeve part 60 has a series of holes 70 which communicate with the lower chamber 20. The lower sleeve part 60 extends outward of the lower shell 22 to terminate in a flared end 72 engageable with the valve seat 52.

A spring 74 bears against the flange 68 of the tubular sleeve 57 with the lower end of the spring 74 bearing against the inner wall of the shell 20.

Figure 2:
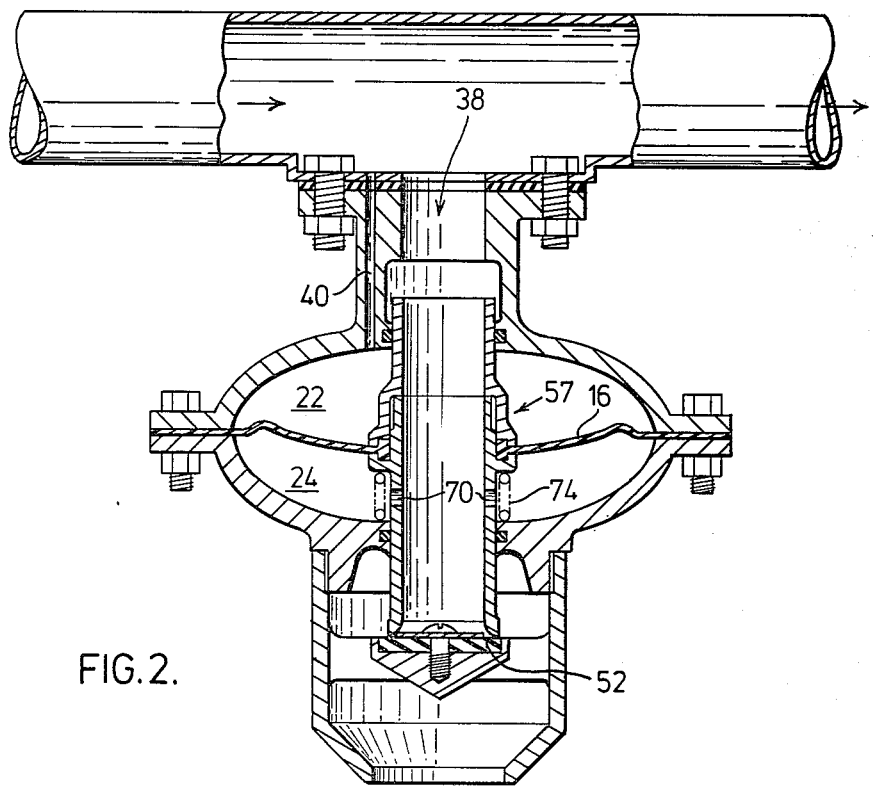

If the primary pressure in the conduit 10 exceeds the secondary pressure by a predetermined amount, the action of the primary pressure through the the offset channel 40 on the upper side of the diaphragm 16 forces the sleeve assembly 57 downwardly into sealing engagement with the seat 52 as shown in FIG. 2. However, if the primary pressure exceeds the secondary pressure by less than the predetermined amount, then the secondary pressure acting on the lower side of the diaphragm 16 through the channel 38 and the holes 70 of the sleeve assembly 57 causes the diaphragm 16 to move upwardly so that the sleeve 57 moves away from the seat 52 as shown in FIG. 1 to permit fluid to escape past the valve seat 52 until the pressure differential rises to the predetermined amount, which is set by the spring 74.

The primary and secondary pressures in the conduit 10 which act on the valve can be created in a number of conventional ways, each of which affect the flow and accentuate the drop in pressure which exists in the conduit in order that flow will take place from the inlet to the outlet.

For purposes of illustration only, a restriction 80 is shown in the conduit 10 between the orifices 12 and 14, which restriction 80 will affect the flow and accentuate the drop in pressure in the conduit to which the valve of the invention is responsive.

I claim:

1. A differential pressure relief valve having a housing with first and second channels, said housing being adapted for facial connection to primary and secondary pressure zones in a conduit through said channels respectively, a first chamber in said housing connecting with the inner end of said first channel, a second chamber in said housing separated from said first chamber by an annular diaphragm supported by said housing, a movable sleeve in said housing secured to the inner edge of said diaphragm, said sleeve tranversing said chambers and sealed in said housing to isolate said chambers from the atmosphere, said sleeve having an aperture communicating with said lower said lower chamber, a seat in said housing exterior of said second chamber with the end of said sleeve protruding from said second chamber engageable with said seat and the other end of said sleeve, protruding from said first chamber, communicating with said secondary pressure zone through said second channel, the arrangement being such that when the primary pressure exceeds the secondary pressure by a predetermined amount, the lower end of the sleeve engages said seat due to the primary pressure on said diaphragm but when the primary pressure does not exceed the secondary pressure by the predetermined amount, the lower end of the sleeve does not engage the seat and fluid escapes from the conduit through the second channel and the sleeve past the seat.

2. A differential pressure relief valve according to claim 1 wherein a spring bears against said sleeve and the underside of said diaphragm to set the differential pressure at the predetermined amount.

3. A differential pressure relief valve according to claim 2 wherein said first and second chambers are formed respectively of first and second half shells and having a flange with said diaphragm secured between said flanges.

* * * * *